(12) United States Patent
Vasko et al.

(10) Patent No.: US 7,784,846 B2
(45) Date of Patent: Aug. 31, 2010

(54) COVERING FOR INTERIOR VEHICLE SURFACES AND METHOD OF APPLYING COVERING

(75) Inventors: Melaina Vasko, Farmington Hills, MI (US); Doug Dawe, Farmington Hills, MI (US); Thomas Mally, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 63 days.

(21) Appl. No.: 12/174,828

(22) Filed: Jul. 17, 2008

(65) Prior Publication Data

US 2010/0013260 A1 Jan. 21, 2010

(51) Int. Cl.
*B62D 33/00* (2006.01)
(52) U.S. Cl. .................................................. 296/39.1
(58) Field of Classification Search ............... 296/29.1, 296/1.08, 136.1, 146.7, 187.05, 214, 71, 296/93; 280/728.3, 732, 728.2, 730.2, 743.1; 301/108.4; 428/31; 52/716.5, 208
See application file for complete search history.

(56) References Cited

U.S. PATENT DOCUMENTS

| | | | | |
|---|---|---|---|---|
| 2,633,442 A | * | 3/1953 | Caldwell | .................... 156/210 |
| 4,250,218 A | * | 2/1981 | Tallon | ......................... 428/166 |
| 4,441,762 A | * | 4/1984 | Segal | ..................... 301/37.105 |
| 5,091,031 A | * | 2/1992 | Strapazzini | .................. 156/211 |
| 5,536,351 A | * | 7/1996 | Rheinlander et al. | ........ 156/212 |
| 5,824,391 A | | 10/1998 | Davis | |
| 5,964,623 A | * | 10/1999 | Maher et al. | ................. 439/668 |
| 6,612,708 B2 | | 9/2003 | Chu | |
| 7,332,210 B2 | | 2/2008 | Arms et al. | |
| 2003/0165664 A1 | * | 9/2003 | Carroll et al. | ............... 428/138 |
| 2005/0272330 A1 | * | 12/2005 | Gray et al. | ..................... 442/38 |
| 2007/0137926 A1 | * | 6/2007 | Albin et al. | ................. 181/290 |
| 2007/0194487 A1 | * | 8/2007 | Neitzke | ....................... 264/255 |
| 2008/0073813 A1 | * | 3/2008 | Smith et al. | .............. 296/146.7 |
| 2008/0135167 A1 | * | 6/2008 | Simmons et al. | ............ 156/245 |
| 2008/0182076 A1 | * | 7/2008 | Kondo et al. | ................. 428/172 |

* cited by examiner

*Primary Examiner*—Kiran B. Patel
(74) *Attorney, Agent, or Firm*—Young Basile

(57) ABSTRACT

Disclosed herein are interior vehicle surfaces having a substrate and a covering having imposed thereon a decorative pattern. The covering is applied to the substrate oriented so that a segment of the decorative pattern forms an angle of less than ninety degrees with a visual reference line. Application of the covering includes determining a visual reference line with respect to the interior vehicle surface to be covered, rotating the covering less than ninety degrees such that a segment of the pattern originally parallel to the visual reference line is now angled with respect to the visual reference line and applying the rotated covering to the interior vehicle surface.

20 Claims, 3 Drawing Sheets

COVERING FOR INTERIOR VEHICLE
SURFACES AND METHOD OF APPLYING
COVERING

FIELD OF THE INVENTION

The present invention relates to the field of interior vehicle surfaces having decorative patterns, coverings for interior vehicle surfaces having decorative patterns, and methods of applying the coverings. In particular, the present invention relates to interior vehicle coverings and application methods to reduce or eliminate visual distortion of the decorative pattern.

BACKGROUND

Automobiles are marketed and sold on the basis of differentiation over other competitive models. Areas of differentiation may include, for example, style and color. Differentiation in these areas for the interior of the vehicle can be accomplished by using different materials with decorative patterns. For example, vehicle seats may be upholstered in a decorative material or in perforated leather. Trim panels or appliqués on the interior and exterior of the vehicle may be incorporated to improve a vehicle's aesthetics. The aesthetic value of a decorative covering is significantly reduced if distortion is visually noticeable after application or installation. Distortion can occur, for example, when the material is stretched and/or wrapped over the edges of a surface during application. Patterns with straight lines or orthogonal indicia are particularly prone to distortion. The distortion is pronounced when the material is used adjacent to a longitudinal reference line that a consumer's eye will naturally follow. To avoid distortion, patterns have been printed directly on the vehicle component; however, costs per component are increased with this process. Vacuums have been used in an effort to reduce the distortion that occurs during application, but this often results in bubbles under the film and discoloration, which further decrease aesthetic value.

SUMMARY

Embodiments of interior vehicle surfaces are disclosed herein. One embodiment of an interior vehicle surface comprises a substrate and a covering having imposed thereon a decorative orthogonal pattern. The covering is applied to the substrate oriented so that a segment of the decorative orthogonal pattern forms an angle of less than ninety degrees with a visual reference line.

Another embodiment of an interior vehicle surface disclosed herein is a covering comprising a material having imposed thereon a decorative pattern formed of an orthogonal matrix of nodes, wherein adjacent nodes form one of a right angle and a straight line. The material is applied to the interior surface so that a parallel line between nodes forms an angle of less than ninety degrees with a visual reference line inside the vehicle.

Also disclosed herein are methods of applying a covering having a decorative orthogonal pattern to an interior vehicle surface. One such method comprises determining a visual reference line with respect to the interior vehicle surface to be covered, rotating the covering having the decorative orthogonal pattern less than ninety degrees such that a segment of the orthogonal pattern originally parallel to the visual reference line is now angled with respect to the visual reference line and applying the rotated covering to the interior vehicle surface.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
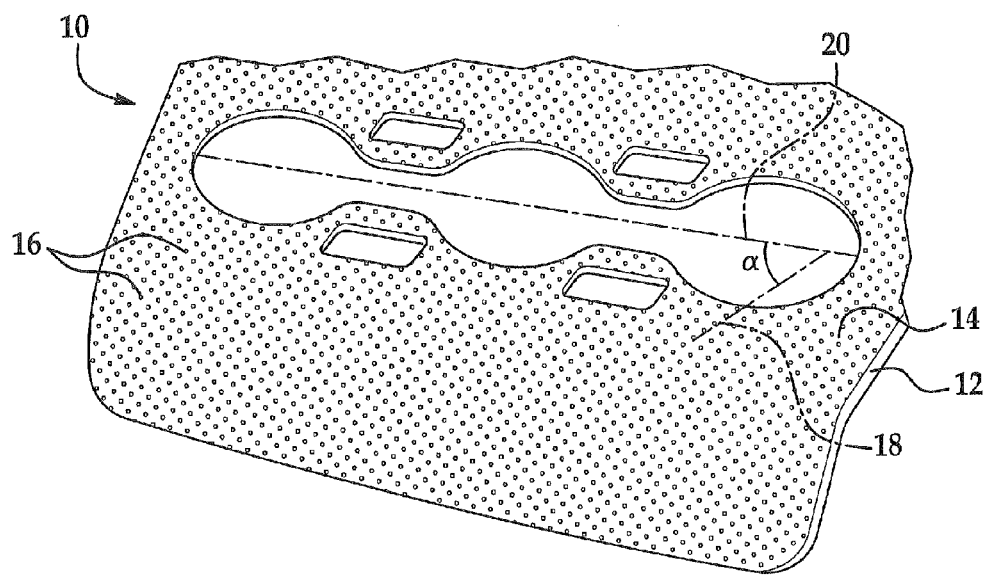
FIG. 1 is a perspective view of a the vehicle component with a first embodiment of the interior vehicle covering disclosed herein.

FIG. 1 depicts an embodiment of an interior vehicle surface as disclosed herein. The interior vehicle surface 10 is comprised of a substrate 12 and a covering 14 having imposed thereon a decorative pattern 16. The pattern is decorative in terms of aesthetic value but is not limited to such. The pattern can also have functional aspects in addition or in the alternative. The covering 14 is applied to the substrate 12 oriented so that a segment 18 of the decorative pattern 16 forms an angle α of less than ninety degrees with a visual reference line 20.

The substrate 12 shown in FIG. 1 is a center console and is provided by way of example and not limitation. Other substrates known by those skilled in the art to be used in the interior of a vehicle are contemplated. For example, the substrate can be another console portion, a door panel, an instrument panel, a dashboard, trim, seats, and the like.

The vehicle in which the interior vehicle surface is incorporated can be any vehicle type. Non-limiting examples of vehicles include cars, trucks, sport utility vehicles, recreational vehicles and the like. The substrate 12 can be made of at least one of plastic and metal. This material is provided by way of example and not limitation and other materials known to those skilled in the art appropriate to form a substrate are contemplated. The substrate 12 can be a curved surface, such as the console shown in FIG. 1, or the substrate 12 can be a flat surface. The substrate can be contoured to have both of at least one flat surface and at least one curved surface. The substrate can be solid, or can have one or more apertures therein.

The covering 14 shown in FIG. 1 is a film applied to the substrate 12. Non-limiting examples of films that can be used as the covering include laminate, appliqués, injection molded paint film, thermoformed paint film, blackout/color-out film, in-mold film and the like. Depending on the substrate, the covering 14 can also be an upholstery material. Non-limiting examples of substrates wherein the covering used can be upholstery include seats and arm rests.

In the illustrated embodiment, decorative pattern 16 includes a matrix of dots (other indicia can be used as well) that form lines or columns that intersect at angles that are substantially perpendicular—that is, are sufficiently close to ninety degrees to appear to be perceived by the average person as being perpendicular. Other patters can be used, including other types of orthogonal designs where lines or columns of the dots form perpendicular slopes or tangents at the point of intersection. Examples of orthogonal patterns will be discussed below with reference to FIGS. 4-9. Segment 18 can be any portion of the pattern between two points of intersection.

The covering 14 is applied to the substrate 12 oriented so that a segment 18 of the decorative pattern 16 forms an angle α of less than ninety degrees with a visual reference line 20. In this case, the visual reference line refers to a site line adjacent the decorative pattern. When the covering is viewed by a consumer, the consumer's eye tends to follow the pattern along the length of the site line. The visual reference line can be integrated with the substrate or can be found adjacent the pattern after the interior vehicle surface 10 is installed in or on the vehicle. Non-limiting examples of visual reference lines include a trim edge, a substrate edge, an edge of an adjacent component, a linear indicia, a longitudinal line of apertures, a longitudinal protrusion, a longitudinal contour, a longitudinal axis of an elongated aperture, and a sewing seam.

Figure 2:
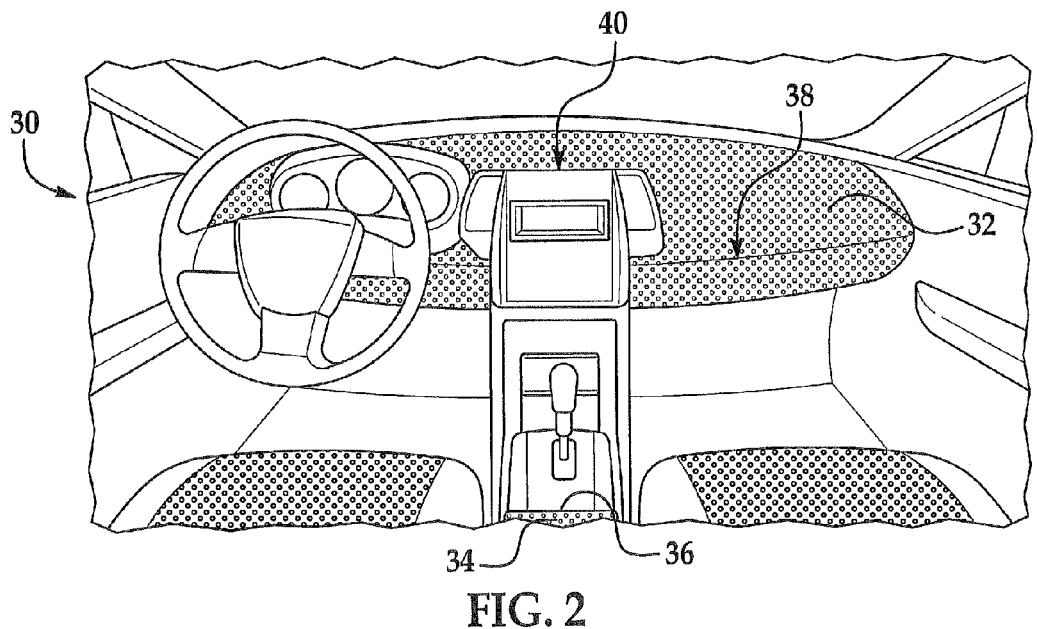
FIG. 2 is a perspective view of an interior of a vehicle incorporating the first embodiment of the interior vehicle covering disclosed herein.

The visual reference line 20 in FIG. 1, shown with a dashed line, is an example of a longitudinal axis of an elongated aperture. Other visual reference lines can be seen in FIGS. 1 and 2. The dashed line 21 in FIG. 1 is an example of a visual reference line along a longitudinal line of apertures. The dashed line 22 is an example of a visual reference line along a longitudinal contour. FIG. 2 is a perspective view of a portion of an interior of a vehicle. The view of the vehicle interior 30 includes embodiments of an interior vehicle surface disclosed herein comprised of a dashboard 32 and a portion of the center console 34. FIG. 2 is meant to be exemplary of the use of the interior vehicle surfaces disclosed herein and is not meant to be limiting. A visual reference line for the interior vehicle surface defined by the center console 34 can be the substrate edge 36. A visual reference line for the interior vehicle surface can be defined by a longitudinal protrusion such as the curvature 38 of the dashboard 32. A visual reference line for the interior vehicle surface can be defined by a trim edge 40 of an adjacent component.

Referring back to FIG. 1, the covering 14 is rotated or oriented in such a way before application to the substrate 12 so that the angle α between the visual reference line 20 and the segment 18 of the pattern is less than ninety degrees. In particular, the covering 14 can be rotated or oriented so that the angle α between the visual reference line 20 and the segment 18 is between about forty and about fifty degrees. More particularly, the covering 14 can be rotated or oriented so that the angle α between the visual reference line 20 and the segment 18 is about forty-five degrees.

With the decorative pattern 16 oriented in this manner, the consumer's eye cannot pick up the distortion that is present due to stretching of the covering, wrapping the covering about holes in the substrate, curvature of the substrate or other factors that can cause distortion after application of the covering 14 to the substrate 12. Rotating or orienting the decorative pattern 16 in this manner hides the distortion by not allowing the eye to find a single line and follow that line across the entire length of the visual reference line 20. The distortion seen by the consumer if the pattern is not rotated decreases the aesthetic value of the covering and the vehicle in which it is incorporated.

Figure 3:
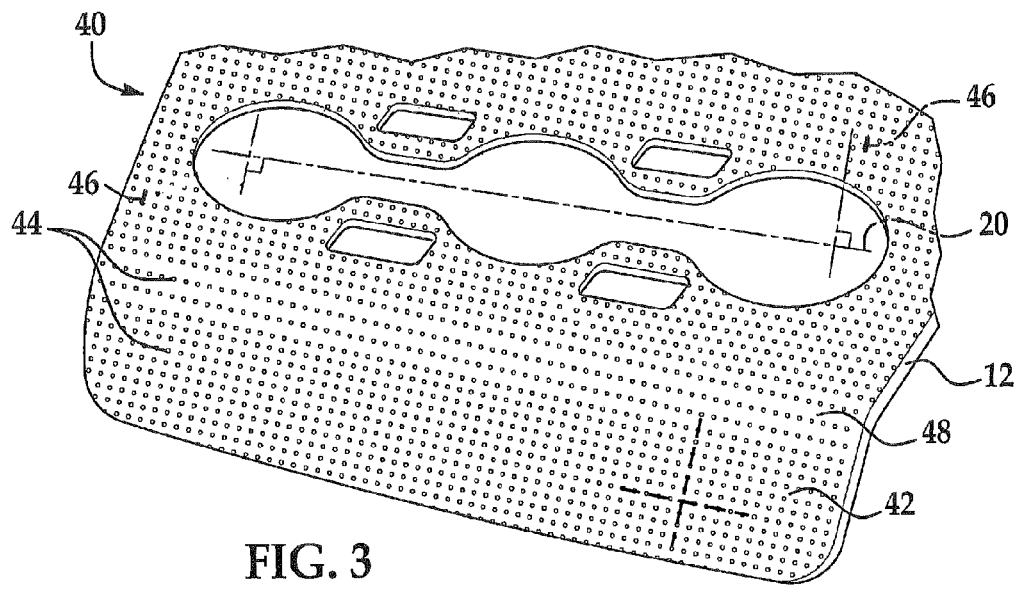
FIG. 3 illustrates the vehicle component of FIG. 1 without an embodiment of the interior vehicle covering disclosed herein.

FIG. 3 illustrates an interior vehicle surface 10 comprised of a covering 42 having a decorative pattern 44 applied to the same substrate 12 as that shown in FIG. 1—a portion of a console. However, in FIG. 3, the covering 42 is not oriented prior to application to the substrate 12, so that the segment 46 of the decorative pattern 44 is perpendicular to the visual reference line 20, rather than forming an angle of less than ninety degrees with the visual reference line 20. The distortion of the decorative pattern 44 is easily picked up by the consumer's eye due to the perpendicular and parallel arrangement of the segments 46 with respect to the visual reference line 20. This distortion is visible with reference to the curvature 48 of the substrate 12 as well, which also acts as a visual reference line. The aesthetic value of the vehicle is decreased, thereby decreasing the overall value of the vehicle to the consumer.

Application by vacuum can be used to reduce distortion of the pattern; however, this can result in bubbles under the covering and discoloration, further decreasing and possibly eliminating the aesthetic value provided by the covering. It has been known to apply a decorative pattern directly to the substrate, particularly when the substrate is aluminum. However, this increases costs to the consumer and is not a viable alternative in most situations. Maintaining costs and increasing aesthetic value of the substrates with decorative coverings has been achieved by orienting the covering in such a way before application to the substrate 12 so that the angle α between the visual reference line 20 and the segment 18 of the pattern is less than ninety degrees.

FIGS. 1-3 illustrate a decorative pattern having circular indicia spaced equidistant along invisible parallel and perpendicular lines. This pattern is provided by way of example and is not limiting. Other patterns having lines or indicia along lines intersecting or lying at right angles are contemplated.

Another embodiment of an interior vehicle surface disclosed herein is a covering comprising a material having imposed thereon a decorative pattern formed of a matrix of nodes, wherein adjacent nodes form one of a right angle and a straight line. The material is applied to the interior surface so that one or a set of parallel lines between nodes forms an angle of less than ninety degrees with a visual reference line inside the vehicle.

Non-limiting examples of materials from which the covering can be comprised include laminate, appliqués, injection molded paint film, thermoformed paint film, blackout/color-out film, in-mold film, and upholstery.

The surface to which the covering is applied can be, as non-limiting examples, a console, a door panel, an instrument panel, a dashboard, trim, seats, and the like. The vehicle in which the interior vehicle surface is incorporated can be any vehicle type. Non-limiting examples of vehicles include cars, trucks, sport utility vehicles, recreational vehicles and the like. The surface can be made of at least one of plastic and metal. This material is provided by way of example and not limitation and other materials known to those skilled in the art appropriate to form a surface are contemplated. The surface can be a curved surface or flat surface. The surface can be contoured to have both of at least one flat surface and at least one curved surface. The surface can be solid, or can have one or more apertures therein.

The visual reference line inside the vehicle can be located on the surface to be covered or can be adjacent the surface to be covered. Non-limiting examples of visual reference lines are discussed in relation to FIGS. 1 and 2 and can include a trim edge 40, a substrate edge 36, an edge of an adjacent component 36, 40, a linear indicia 23, a longitudinal line of apertures 21, a longitudinal protrusion 38, a longitudinal contour 22, a longitudinal axis of an elongated aperture 20, and a sewing seam in, for example, upholstery.

Figure 4:
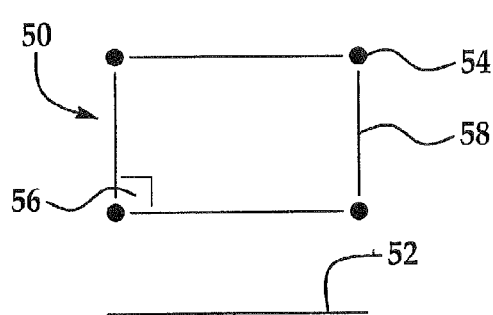
FIG. 4 is an exploded partial view of an example of an orthogonal decorative pattern of a second embodiment.

FIG. 4 illustrates an example of a covering comprising a material having imposed thereon a decorative pattern formed of a matrix of nodes, wherein adjacent nodes form one of a right angle and a straight line. FIG. 4 is an exploded view of the pattern 50 adjacent a visual reference line 52 prior to orientation. The pattern 50 is comprised of a matrix of nodes 54, with adjacent nodes 54 forming one of a right angle 56 and a straight line 58, with the straight line 58 forming one or a set of parallel lines 58 between nodes 54. The parallel line (s) 58 is shown in FIG. 4 prior to orientation relative to the visual reference line 52.

Figure 5:
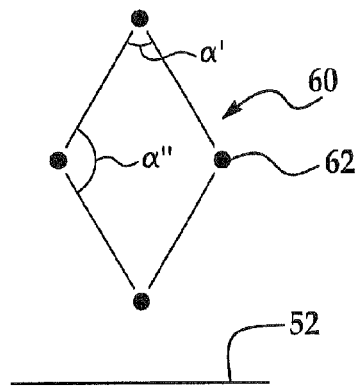
FIG. 5 is an exploded partial view of a comparative example to FIG. 4 of a non-orthogonal decorative pattern.

Provided as a comparative example, FIG. 5 illustrates a pattern 60, wherein adjacent nodes 62 do not form right angles. As seen in FIG. 5, the nodes 62 are positioned such that at least two different size angles $\alpha'$, $\alpha''$ are formed between different nodes 62. Angle $\alpha'$ is less than a right angle, and angle $\alpha''$ is greater than a right angle.

Figure 6:
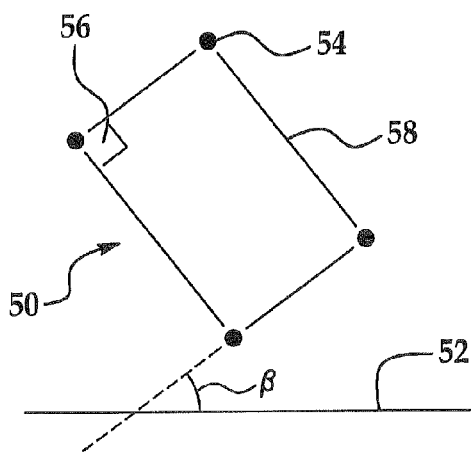
FIG. 6 is an exploded partial view of the first embodiment of FIG. 1 illustrating a reference line.

FIG. 6 is the same exploded view of the pattern 50 of FIG. 4 after orientation relative to the visual reference line 52. In FIG. 6, the material has been oriented prior to application to the interior surface so that the one or a set of parallel lines 58 between nodes 54 forms an angle $\beta$ of less than ninety degrees with the visual reference line 52. Once proper orientation has been achieved, the covering can be applied to the interior vehicle surface.

Figure 7:
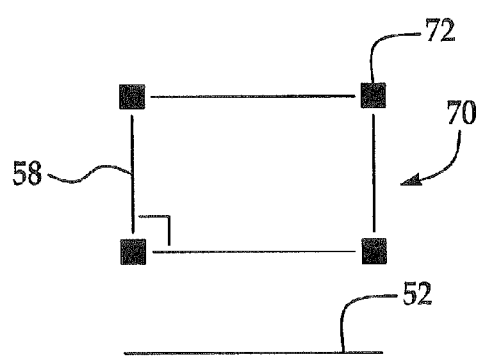
FIG. 7 is an exploded partial view of an alternative example of a decorative pattern of a third embodiment.
Figure 8:
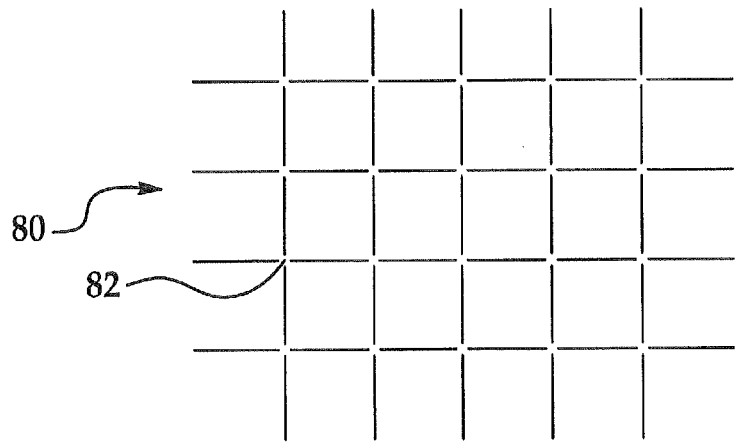
FIG. 8 is an exploded partial view of another alternative example of a decorative pattern in a fourth embodiment.
Figure 9:
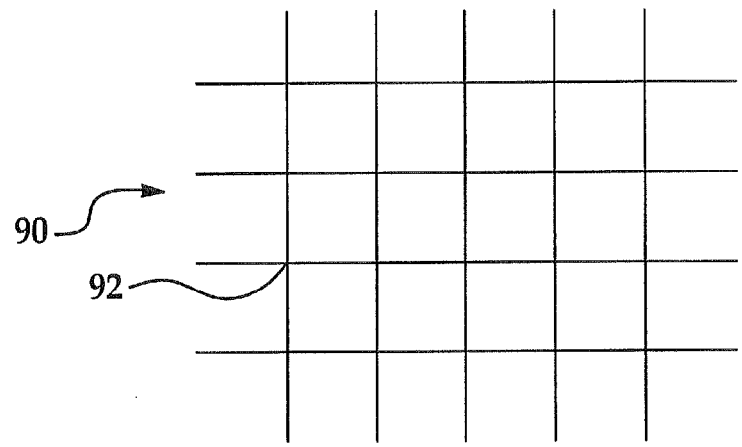
FIG. 9 is exploded partial view of an example of yet another alternative of a decorative pattern in a fifth embodiment.

FIGS. 7-9 illustrate alternative decorative patterns that can be incorporated into the interior vehicle coverings and surfaces disclosed herein. These are provided as examples and are not meant to be limiting. Various other decorative patterns are contemplated.

FIG. 7 shows an exploded view of a pattern 70 having a matrix of nodes 72, wherein the nodes 72 are a different shape than those depicted in FIGS. 4 and 6. Although the nodes 72 are depicted as squares, the squares are provided by way of example and not limitation and any suitable shape can be used to form a node. The nodes can be solid, as shown, or can be an outline of a shape. The parallel lines 58 shown in FIGS. 4, 6 and 7 can be solid lines connecting the nodes, broken or dashed lines connecting the nodes, or invisible lines. The lines 58 can be straight or can be non-linear, such as waved.

As an alternative, FIG. 8 depicts a pattern 80 wherein the nodes 82 are represented by a blank space or void between the right angles and straight lines. In other words, the pattern 80 is represented by a grid of parallel and perpendicular lines with the intersections of the lines voided out. The area of intersection voided out represents the nodes 82, with the nodes forming the matrix of the pattern 80. The grid lines can be solid lines connecting the nodes or broken or dashed lines connecting the nodes. The lines can be straight or can be non-linear, such as waved.

Another alternative is shown in FIG. 9, wherein the pattern 90 is represented by a grid of perpendicular and parallel lines. The nodes 92 are represented by the intersection of the grid lines. The grid lines can be solid lines connecting the nodes or dashed lines connecting the nodes. The lines can be straight or can be non-linear, such as waved.

Figure 10:
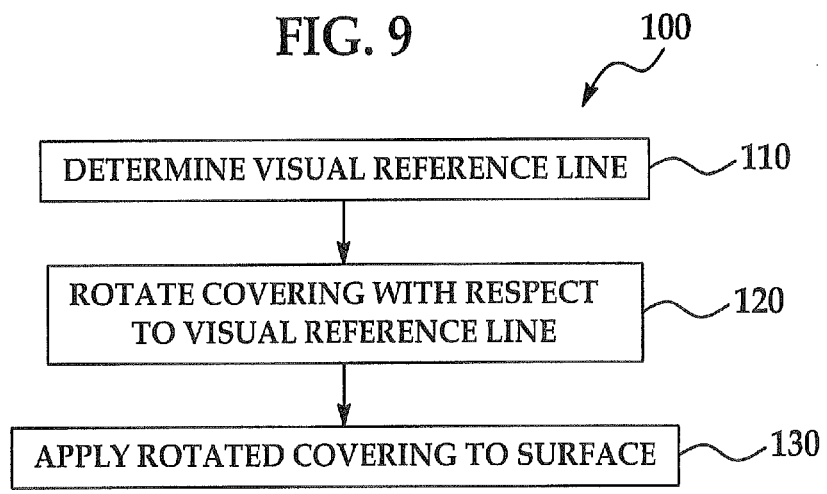
FIG. 10 is a flow diagram of a method of application of any of the embodiments disclosed herein.

Also disclosed herein are methods of applying a covering having a decorative pattern to an interior vehicle surface. Referring to FIG. 10, one such method 100 comprises determining a visual reference line with respect to the interior vehicle surface to be covered 110, rotating the covering having the decorative pattern less than ninety degrees such that a segment of the pattern originally parallel to the visual reference line is now angled with respect to the visual reference line 120 and applying the rotated covering to the interior vehicle surface 130.

The visual reference line with respect to the interior vehicle surface to be covered in step 110 can be integrated with the surface to be covered or can be found adjacent the surface after the interior vehicle surface is positioned within the vehicle. Non-limiting examples of visual reference lines include a trim edge, a substrate edge, an edge of an adjacent component, a linear indicia, a longitudinal line of apertures, a longitudinal protrusion, a longitudinal contour, a longitudinal axis of an elongated aperture, and a sewing seam.

The covering 14 is rotated or oriented in step 120 in such a way before application to the interior vehicle surface so that the angle $\alpha$ between the visual reference line and the segment of the pattern is less than ninety degrees. In particular, the covering can be rotated or oriented so that the angle $\alpha$ between the visual reference line and the segment is between about forty and about fifty degrees. More particularly, the covering can be rotated or oriented so that the angle $\alpha$ between the visual reference line and the segment is about forty-five degrees.

The rotated covering is applied to the interior vehicle surface in step 130 in any manner well known to those skilled in the art to be suitable with the covering material and the surface material. The covering can be applied by lamination, adhesion, heat, pressure, friction fitting, sewing, and other means known to those skilled in the art. As a non-limiting example, in-mold film with a decorative pattern can be stretched over and pressed against an aluminum cast of an interior vehicle substrate or surface. The air between the cast and the film is removed and the film becomes rigid. The rigid film is then applied to the substrate or surface with adhesive.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An interior vehicle surface comprising:
   a substrate having a curved surface; and
   a covering capable of being stretched and having imposed thereon a decorative orthogonal pattern, wherein the covering is applied to the substrate oriented so that a segment of the decorative orthogonal pattern forms an angle of less than ninety degrees with a visual reference line defined by a substrate edge.

2. Tile interior vehicle surface of claim 1, wherein the substrate has a flat surface and the covering is stretched.

3. The interior vehicle surface of claim 1, wherein the orthogonal pattern is a grid of at least one of solid lines, broken lines, and non-linear lines.

4. The interior vehicle surface of claim 2, wherein the intersections of the lines of the grid have indicia formed a solid shape.

5. The interior vehicle surface of claim 1, wherein the orthogonal pattern is formed of indicia at an intersection of imaginary lines on a grid.

6. The interior vehicle surface of claim 1, wherein the substrate is at least one of a seat, a console, a door panel, an instrument panel and a dashboard.

7. The interior vehicle surface of claim 1, wherein the covering is a film molded by stretching and wrapping over the substrate or a cast of the substrate.

8. The interior vehicle surface of claim 1, wherein the covering is oriented so that the segment of the decorative orthogonal pattern forms an angle of between about forty degrees and about fifty degrees with the visual reference line.

9. The interior vehicle surface of claim 1, wherein the decorative orthogonal pattern is formed of an orthogonal matrix of nodes, wherein adjacent nodes form one of a right angle and a straight line, and wherein the material is applied to the interior surface so that a parallel line between nodes forms an angle of less than ninety degrees with a visual reference line inside the vehicle.

10. The interior vehicle surface of claim 9, wherein the nodes are indicia.

11. The interior vehicle surface covering of claim 1, wherein the covering is one of an appliqué, a film, a molded film and an upholstery.

12. The interior vehicle surface of claim 3, wherein the intersections of the lines of the grid have indicia formed of a blank space.

13. The interior vehicle surface of claim 9, wherein the nodes are intersecting lines.

14. The interior vehicle surface of claim 9, wherein the nodes are breaks in lines.

15. The interior vehicle surface of claim 1, wherein the substrate edge is a trim edge.

16. The interior vehicle surface of claim 1, wherein the substrate edge is defined by linear indicia.

17. The interior vehicle surface of claim 1, wherein the substrate edge is defined by a longitudinal line of apertures.

18. The interior vehicle surface of claim 1, wherein the substrate edge is a longitudinal protrusion.

19. The interior vehicle surface of claim 1, wherein the substrate edge is a longitudinal contour.

20. The interior vehicle surface of claim 1, wherein the substrate edge is defined by a longitudinal axis of an elongated aperture.

* * * * *